United States Patent [19]

Kuenen

[11] Patent Number: 4,718,789
[45] Date of Patent: Jan. 12, 1988

[54] JOINT BETWEEN A TUBE AND A ROD OR OTHER TUBE BEING AT AN ANGLE TO THE FORMER

[76] Inventor: Dirk J. G. Kuenen, Anna van Saksenstraat 14, 7051 BD Varsseveld, Netherlands

[21] Appl. No.: 771,910

[22] Filed: Sep. 3, 1985

[30] Foreign Application Priority Data

Mar. 20, 1984 [NL] Netherlands ............... 8400882

[51] Int. Cl.⁴ .............................................. F16B 13/10
[52] U.S. Cl. ................................. 403/233; 403/362; 403/264; 403/191
[58] Field of Search ............... 403/297, 362, 233, 264, 403/234, 235, 237, 190, 191, 192

[56] References Cited

U.S. PATENT DOCUMENTS

| | | | |
|---|---|---|---|
| 2,764,438 | 9/1956 | Haviland | 403/234 |
| 2,850,304 | 9/1958 | Wagner | 403/362 X |
| 2,941,855 | 6/1960 | Weill | 403/237 |
| 2,997,317 | 8/1961 | Scott | 403/297 X |
| 3,522,960 | 8/1970 | Moore . | |
| 3,606,408 | 9/1971 | Wagner | 403/297 |
| 3,915,101 | 10/1975 | Onori | 403/234 X |

FOREIGN PATENT DOCUMENTS

| | | |
|---|---|---|
| 2113537 | 8/1983 | United Kingdom . |
| 2018648 | 8/1971 | Fed. Rep. of Germany . |
| 2063488 | 7/1971 | France . |
| 62208 | 7/1967 | German Democratic Rep. ............ 403/297 |
| 93130 | 1/1960 | Netherlands . |

*Primary Examiner*—Randolph A. Reese
*Assistant Examiner*—Joseph A. Fischetti
*Attorney, Agent, or Firm*—John P. Snyder

[57] ABSTRACT

A first tube intersecting a second tube is joined to the second tube by a clamp around the second tube having limbs projecting into the first tube. A screw thread member cooperates with the limbs and has an end portion seated against a first inner surface of the first tube to force one of the limbs against that inner surface of the first tube opposite the first inner surface while moving the other limb away from the first inner surface of the first tube to tighten the clamp.

18 Claims, 9 Drawing Figures

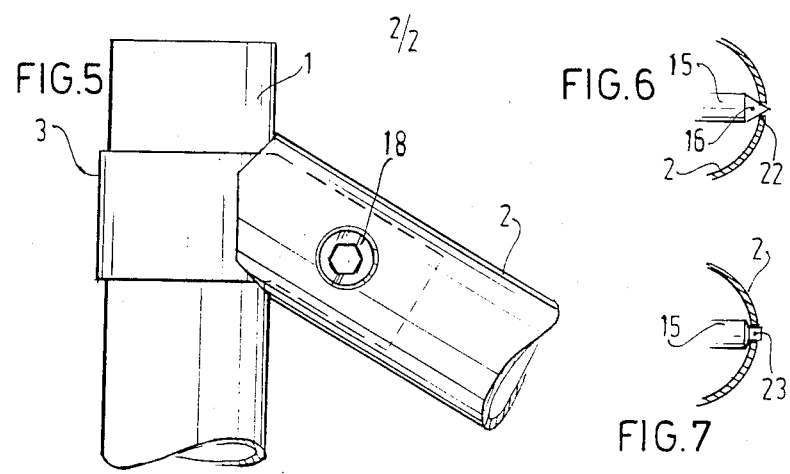
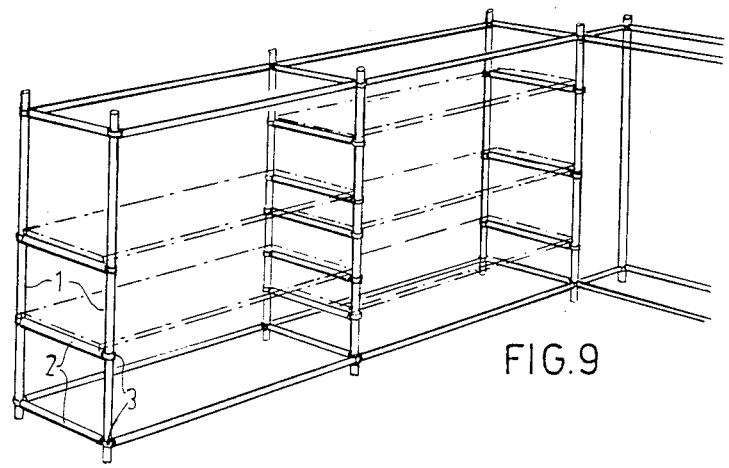
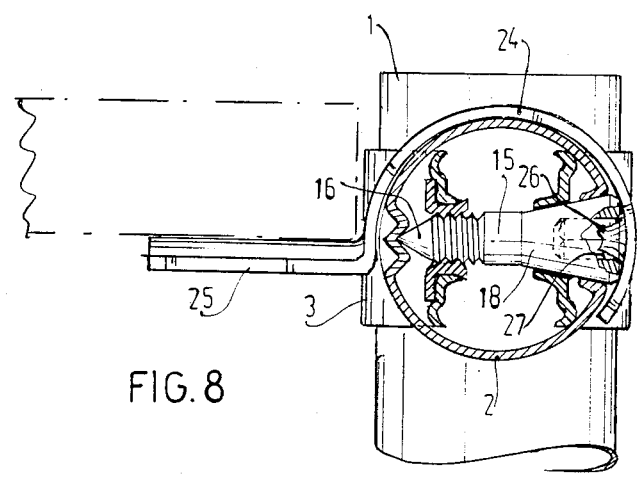

JOINT BETWEEN A TUBE AND A ROD OR OTHER TUBE BEING AT AN ANGLE TO THE FORMER

BACKGROUND AND BRIEF SUMMARY OF THE INVENTION

This invention is directed in particular to improvements in joint constructions such as are shown and described in Dutch Patent Specification No. 93,130. Joint constructions of this type are useful in joining a support member such as a rod or tube to tubular members, as, for example may be useful in building a scaffold, ladder or like structure. In general, such joint constructions encompass a clamp means which clamps upon a support member and presents limbs which are received inside a tube which extends angularly from and is to be supported by the supporting member. The clamp means includes screw thread means cooperating with the limbs to clamp the saddle portions of the clamp means upon the support member.

An object of the invention is to provide an improved joint construction which is both effective and economical. To this end, the clamp means includes two saddle portions which are adapted to engage against the outer surface of the support member in generally opposed relation and presenting first and second limbs projecting therefrom which are spaced apart and generally parallel to each other and the axis of the tube to be supported. The two limbs are provided with aligned openings with the opening in the first limb being internally threaded. The clamp means includes screw thread means having a threaded portion engaging with the internal threads of the first limb and an end portion which engages the tube. Operation of the screw thread means reacts against the tube to force the second limb against the inner surface of the tube while forcing the second limb away from the inner surface of the tube and to compel the saddle portions to clamp upon the support member.

In one embodiment of the invention, the reaction forces imparted by the screw thread means upon the tube are divided and distributed into diametrically opposite regions of the tube. This is accomplished by having the head portion of the screw thread means bear upon the tube around an opening therein whereas the opposite end of the means bears upon the inner surface of the tube. A particularly useful embodiment of this type employs a tapered head which not only seats upon the tube but also seats within an opening in the first limb, thereby limiting the clamping force exerted by the second limb upon the inner surface of the tube. At the same time, the movement of the two limbs toward each other, and the consequent clamping force of the saddle portions against the support member, is made independent of the clamping force exerted by the second limb against the inner surface of the tube. In this way, deformation of the tube is minimized.

BRIEF DESCRIPTION OF THE DRAWING FIGURES

The invention will be described more fully with reference to the drawing. The drawing shows in:

FIG. 1 a sectional view of two tubes interconnected at an angle of 90° in accordance with the invention;

FIG. 2 a cross-sectional view taken on the line II—II in FIG. 1;

FIG. 3 a sectional view of three tubes interconnected at angles of 90° in accordance with the invention;

FIG. 4 a cross-sectional view taken on the line IV—IV in FIG. 3;

FIG. 5 an elevational view of a rod or tube with which a tube is connected at an angle of 60°;

FIG. 6 a cross-sectional view of part of a joint embodying the invention, in which the screw bolt extends by its conical insertion end in a hole of the wall of a tube and thus guarded against radial displacement;

FIG. 7 a cross-sectional view of a variant of the detail of FIG. 6;

FIG. 8 a cross-sectional view of a horizontal tube of a framework with a joint embodying the invention and an elevational view of a supporting bracket bearing on said tube; and FIG. 9 a perspective view of part of a storage frame work to which the invention is applied.

DETAILED DESCRIPTION

Figure 1:
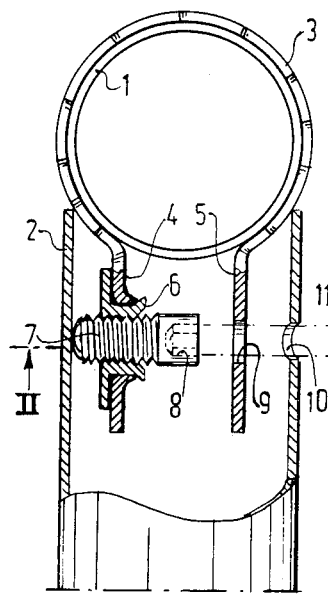
Figure 2:
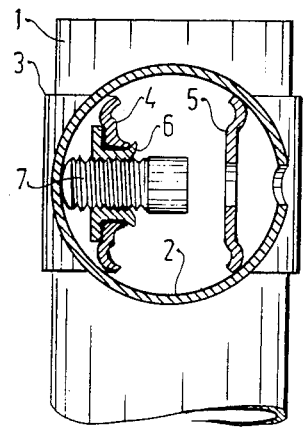

Referring to FIGS. 1 and 2, reference numeral 1 designates a vertical, tubular post of a scaffolding, a showwindow stand, an exposition rack, a ladder, steel furniture or other construction composed of other rod-shaped elements. This post may be replaced by a rod. Reference numeral 2 designates a horizontal tube connected with the tube 1. The joint between the tubes 1 and 2 comprises a clamping tape 3 arranged around the tube 1, the ends of which terminate in limbs 4 and 5. The limb 4 has rigidly secured to it a nut 6 into which is screwed a screw bolt 7 with a socket hole 8. The limb 5 and the wall of the tube 2 have holes 9 and 10 coaxial with the nut 6 and sufficiently large for passing a socket wrench 11.

When the bolt 7 is sufficiently turned back, the limbs 4, 5 on the clamping tape 3 surrounding the tube 1 form together a plug that can be inserted with some clearance into the tube 2. When the plug 4, 5 is at its place in the tube 2, the nut 6 and the hole 9 are coaxial with the hole 10 so that the socket wrench 11 can be inserted inwardly into the socket hole 8. When the bolt is tightened with the aid of said wrench, the insertion end of the bolt 7 comes into contact with the inner surface of the tube 2 and the limbs 5, 4 are pressed to the right, viewed in FIGS. 1 and 2. The limb 5 is thus pressed by its longitudinal edges against the tube 2. When the bolt 7 is further tightened, the limb 4 is screwed towards the limb 5 and the clamping tape 3 is clamped tight around the tube 1. The clamping tape 3 and the limbs 4, 5 are formed by a single, curved, bent-over strip of sheet material. By profiling the cross section of the strip in the limbs 4, 5 the longitudinal resistance to bending of the latter is materially raised.

The embodiment shown in FIGS. 1 and 2 is very simple and cheap, it is true, but it has a few disadvantages. When the bolt 7 is sufficiently tightened to ensure a satisfactory clamping between the tube 1 and the clamping tape 3, the clamping of the bolt 7 and the limb 5 in the tube 2 may still allow a withdrawal of the plug 4, 5, 7 out of the tube 2 under given loads. Moreover, the limb 4 may be drawn obliquely with respect to the limb 5. There is, moreover, the risk that the bolt 7 is tightened to an extent such that the tube 2 is deformed at the area of the insertion end of the bolt 7 and of the edges of the limb 5. This risk is the greater, the thinner is the wall of the tube 2.

Figure 3:
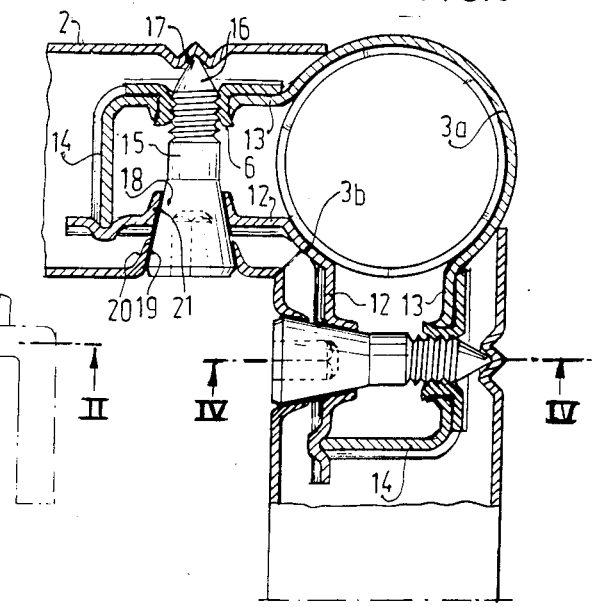
Figure 4:
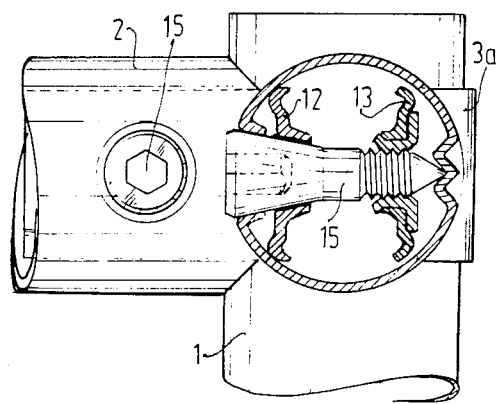

Said disadvantages of the embodiment of FIGS. 1 and 2 are obviated in the embodiment shown in FIGS. 3 and 4. FIG. 3 shows, moreover, that more than one tube 2 can be connected in the same plane with the tube 1 in the manner according to the invention.

Referring to FIGS. 3 and 4 the clamping tape is split at two places so that it consists of two parts 3a and 3b. At its end the part 3a terminates in limbs 12 and part 3b in limbs 13. Each pair of co-operating limbs 12 and 13 again forms a plug insertable into the tube 2. At its free end the limb 13 is bent over and forms with the bent-over part a spacer 14 between the limbs 12 and 13. This spacer 14 ensures that the limbs 12 and 13 remain practically parallel when the bolt 15 is being tightened and that the clamping tape 3a, 3b is clamped with a heavy force. The screw bolt 15 bears by the conical insertion end 16 in a pit 17 formed in the wall of the tube 2. The head 18 of the bolt 15 is tapering towards the insertion end and bears in a matching conical hole 19 having an inwardly pressed edge 20 in the wall of the tube 2. Owing to its conical hole 21 the limb 12, just after its longitudinal edges are pressed against the inner surface of the tube 2, finds a stop on the head bolt 18 so that by further tightening the bolt the clamping force between the limb 12 and the tube 2 is not raised, but the clamping force between the clamping tape parts 3a and 3b and the tube 1 is, indeed, raised. This is important when the tube 1 forms a post of a scaffolding, a framework or a ladder whose floor or board bearing on the tube 2 or rung is heavily loaded. A further advantage of this construction is that the bolt 15, 16, 18 is guarded clearance-free against radial displacement and the limbs 12, 13 cannot be drawn out of the tube 2, which could be done in the embodiment shown in FIGS. 1 and 2.

FIG. 5 shows that the two tubes 1 and 2 need not be at right angles to one another.

Referring to FIG. 6 the pit 17 of FIGS. 3 and 4 is replaced by a hole 22 in the wall of the tube 2.

FIG. 7 shows a cylindrical insertion end 23 of the bolt 15. The diameter of this end is smaller than that of the bolt 15 and said insertion end 23 also extends in a hole of the wall of the tube 2.

FIG. 8 shows the same cross-sectional view as FIG. 4. The tube 2 is provided with a bracket 24, 25 whose semi-circular part 24 fits around about half the circumference of the tube and bears thereon, whereas the straight part 25 directed radially to the part 24 forms a horizontal support for a board or a floor of a scaffolding. In order to guard the bracket against turning the part 24 extends with the inwardly directed bulging part 26 obtained by a hole depressed from the outside the socket hole 27 of the bolt head 18.

It is noted that the joint embodying the invention may also be used for rods and tubes of other sections than circular ones.

According to the invention it is also possible to interconnect solid rods by slipping cylindrical sockets onto the respective ends capable of receiving the plugs.

I claim:

1. A joint construction comprising the combination of a support member, a tube having an end portion substantially abutting the support member and angularly extending from said support member and clamp means embracing said support member for supporting the tube relative to the support member;

said clamp means comprising first and second saddle portions seated upon said support member, the first saddle portion contacting a first outer surface portion of the support member and the second saddle portion contacting a second outer surface portion of the support member which is generally opposite to said first outer surface portion, said clamp means also including a first limb projecting from said first saddle portion into said end portion of the tube generally parallel to the axis thereof and a second limb projecting from said second saddle portion into said end portion of the tube generally parallel to the axis thereof but in spaced relation to said first limb, said first limb having opposite side edge portions defining a width which is less than the internal dimension of said tube and said second limb having opposite side edge portions defining a width less than the internal dimension of said tube so that the two limbs are receivable within said end portion of the tube, said first limb having an opening therein provided with internal thread means and said second limb having an opening therein aligned with the opening of the first limb, said tube having an opening therein remote from said end portion of the tube and opposite the opening in the second limb, and screw thread means having an end portion seated against that inner surface of the tube opposite the opening in the tube and a threaded portion engaged with said internal thread means for forcing said first limb away from said inner surface of the tube due to reaction of said end portion of the screw thread means against said inner surface of the tube while forcing the second limb into engagement with the opposite inner surface of the tube and forcibly clamping said first and second saddle portions against said supporting member.

2. A joint construction as defined in claim 1 wherein said screw thread means is provided with a tapered head portion seated in the opening of the tube.

3. A joint construction as defined in claim 2 wherein said opening in said second limb is dimensioned to seat upon the tapered head portion to limit the force which may be imposed upon the inner surface of the tube by the second limb.

4. A joint construction as defined in claim 3 wherein said screw thread means includes an end portion opposite the threaded head portion thereof which is seated in piloted fashion against the inner surface of the tube opposite the opening in the tube.

5. A joint construction as defined in claim 1 wherein said first and second saddle portions are separate with the first saddle portion having a first limb to each of its ends and the second saddle portion having a seciond limb at each of its ends, and a second tube extending from the support member supported by the clamp means.

6. A joint construction as defined in claim 5 wherein said opening in said second limb is dimensioned to seat upon the tapered head portion to limit the force which may be imposed upon the inner surface of the tube by the second limb.

7. A joint construction as defined in claim 6 wherein said screw thread means includes an end portion opposite the tapered head portion thereof which is seated in piloted fashion against the inner surface of the tube.

8. A joint construction which comprises the combination of a support member, a tube extending angularly from the support member, and clamp means embracing the support member for supporting the tube relative to the support member;

said clamp means comprising first and second saddle portions having first and second limbs extending therefrom and received in the tube, the screw thread means cooperating with such limbs and having an end portion seated against one inner surface of the tube for forcing one of the limbs against that inner surface of the tube opposite said one inner surface while moving the other limb away from the one inner surface of the tube to clamp the support member between said saddle portions.

9. A joint construction as defined in claim 8 wherein said screw thread means includes a head portion opposite said end portion simultaneously engaging the tube and said one of said limbs to limit the forcible engagement of said one of the limbs against the inner surface of the tube.

10. A jont construction as defined in claim 9 wherein said head portion is tapered, the tube having a conical seat and said one limb also having a conical seat within both of which the tapered head may seat.

11. A joint construction as defined in claim 10 wherein said screw thread means is of a length to pilot the end portion thereof against the inner surface of the tube when the tapered head portion is seated in the tube.

12. A joint construction as defined in claim 11 wherein said first and second saddle portions are separate with the first saddle portion having a first limb at each of its end and the second saddle potion having a second limb at each of its ends, and a second tube extending from the support member supported by the clamp means.

13. A joint construction comprising the combination of a support member, a cylindrical tube angularly extending from said support member and clamp means embracing said support member for supporting the cylindrical tube relative to the support member;

said clamp means comprising first and second saddle portions seated upon said support member in fact-to-face contact therewith, the first saddle portion contacting a first circumferential extent of the support member and the second saddle portion contacting a second circumferential extent of the support member which is generally diametrically opposed to said first circumferential extent, said clamp means also including a first limb projecting from said first saddle portion into said cylindrical tube generally parallel to the axis thereof and a second limb projecting from said second saddle portion into said cylindrical tube generally parallel to the axis thereof but in spaced relation to said first limb, said first limb having opposite side edge portions defining a width which is less than the internal diameter of said cylindrical tube and said second limb having opposite side edge portions defining a width less than the internal diameter of said cylindrical tube, said first limb having a laterally directed spacer portion at its free end extending therefrom toward said second limb, the length of said spacer portion being such that when it is engaged against said second limb, the two limbs are receivable within said cylindrical tube, said first limb having an opening therein provided with internal thread means and said second limb having an opening therein aligned with the opening of the first limb, said cylindrical tube having an opening therein opposite the opening in the second limb, and screw thread means having a tapered head portion seated in the opening in the cylindrical tube and the opening in the second limb and a threaded portion engaged with said internal thread means for forcing said spacer portion into engagement with said second limb and setting the opposite side edges of the second limb against the inner surface of the cylindrical tube while forcing the two limbs toward each other to forcibly clamp said first and second saddle portions against said supporting member.

14. A joint construction as defined in claim 13 wherein said opening in said first limb is dimensioned to seat upon the tapered head portion to limit the force which may be imposed upon the inner surface of the tube by the second limb.

15. A joint construction as defined in claim 14 wherein said screw thread means includes an end portion opposite the tapered head portion thereof which is seated in piloted fashion against the inner surface of the tube opposite the opening therein.

16. A joint construction as defined in claim 13 wherein said first and second saddle portions are separate with the first saddle portion having a first limb at each of its end and the second saddle potion having a second limb at each of its ends, and a second tube extending from the support member and supported by the clamp means.

17. A joint construction as defined in claim 16 wherein said opening in said first limb is dimensioned to seat upon the tapered head portion to limit the force which may be imposed upon the inner surface of the tube by the second limb.

18. A joint construction as defined in claim 17 wherin said screw thread means includes an end portion opposite the tapered head portion thereof which is seated in piloted fashion against the inner surface of the tube.

* * * * *